United States Patent
Viswanathan et al.

(10) Patent No.: US 9,265,050 B2
(45) Date of Patent: Feb. 16, 2016

(54) METHODS AND SYSTEMS FOR GSM SPECTRUM REFARMING FOR LTE SMALL CELLS

(71) Applicant: Alcatel-Lucent USA Inc., Murray Hill, NJ (US)

(72) Inventors: Harish Viswanathan, Murray Hill, NJ (US); Xingqin Lin, Austin, TX (US)

(73) Assignee: Alcatel Lucent, Boulogne-Billancourt (FR)

( * ) Notice: Subject to any disclaimer, the term of this patent is extended or adjusted under 35 U.S.C. 154(b) by 87 days.

(21) Appl. No.: 13/727,805

(22) Filed: Dec. 27, 2012

(65) Prior Publication Data

US 2014/0187251 A1 Jul. 3, 2014

(51) Int. Cl.
| | |
|---|---|
| *H04W 72/00* | (2009.01) |
| *H04W 72/08* | (2009.01) |
| *H04W 16/14* | (2009.01) |
| *H04W 72/12* | (2009.01) |
| *H04W 16/32* | (2009.01) |

(52) U.S. Cl.
CPC ............ *H04W 72/082* (2013.01); *H04W 16/14* (2013.01); *H04W 72/1215* (2013.01); *H04W 16/32* (2013.01)

(58) Field of Classification Search
CPC .............. H04W 72/082; H04W 16/14; H04W 72/1215; H04W 16/32
See application file for complete search history.

(56) References Cited

U.S. PATENT DOCUMENTS

| | | |
|---|---|---|
| 2007/0149187 A1 | 6/2007 | Levy |
| 2008/0192622 A1 | 8/2008 | Scheim et al. |
| 2008/0305775 A1* | 12/2008 | Aaltonen et al. ........... 455/412.1 |
| 2010/0054161 A1 | 3/2010 | Montojo et al. |
| 2011/0044218 A1 | 2/2011 | Kaur et al. |
| 2011/0230219 A1 | 9/2011 | Shores et al. |
| 2012/0207067 A1 | 8/2012 | Malladi et al. |
| 2012/0327867 A1 | 12/2012 | Kela et al. |
| 2013/0114447 A1* | 5/2013 | Luo et al. ...................... 370/252 |

(Continued)

FOREIGN PATENT DOCUMENTS

| | | |
|---|---|---|
| EP | 2403306 A1 | 1/2012 |
| WO | WO-2008081309 A2 | 7/2008 |

(Continued)

OTHER PUBLICATIONS

Soroush Ghamari et al.: "An approach for automated spectrum refarming for multiple radio access technologies", Telecom World (ITU WT), 2011 Technical Symposium at ITU, IEEE; Oct. 24, 2011; pp. 187-192, XP032070408.

(Continued)

*Primary Examiner* — Keith Fang
(74) *Attorney, Agent, or Firm* — Harness, Dickey & Pierce, P.L.C.

(57) ABSTRACT

One embodiment of the method includes allocating, using a network management entity, at least one of a plurality of physical resource blocks (PRBs) of a first wireless access technology for utilization by a second wireless access technology. A spectrum of the first wireless access technology is embedded within a spectrum of the second wireless access technology. The method further includes communicating, using the network management entity, a message to a controller of the first wireless access technology identifying the PRBs not allocated for utilization by the second wireless access technology.

8 Claims, 6 Drawing Sheets

(56) References Cited

U.S. PATENT DOCUMENTS

2013/0143550 A1* 6/2013 Ostrup et al. ............ 455/424
2013/0301451 A1* 11/2013 Siomina et al. ............ 370/252

FOREIGN PATENT DOCUMENTS

WO  WO-2009126598 A1  10/2009
WO  WO-2010025279 A1  3/2010

OTHER PUBLICATIONS

International Search Report dated Mar. 24, 2014 for corresponding application No. PCT/US2013/076125.
Office Action for Taiwanese Application No. 102105333 dated Jul. 30, 2014.
"Cisco visual networking index: Global mobile data traffic forecast update, 2011-2016," *white paper*, Feb. 2012.
Qualcomm, "LTE advanced: Heterogeneous networks," *white paper*, Jan. 2011.
T. X. Brown, "Cellular performance bounds via shotgun cellular systems," *IEEE Journal on Selected Areas in Communications*, vol. 18, No. 11, pp. 2443-2455, 2000.
J. G. Andrews, F. Baccelli, and R. Ganti, "A tractable approach to coverage and rate in cellular networks," *IEEE Transactions on Communications*, vol. 59, No. 11, pp. 3122-3134, Nov. 2011.
3GPP, "Evolved universal terrestrial radio access (E-UTRA); physical channels and modulation," 3GPP TS 36.211 V10.5.0, Jun. 2012.
Office Action for corresponding U.S. Appl. No. 13/399,499 dated Mar. 13, 2014.
Office Action for corresponding U.S. Appl. No. 13/399,499 dated Jul. 28, 2014.
International Search Report and Written Opinion dated Jun. 3, 2013 for related International Application No. PCT/US2013/025520.
International Preliminary Report dated Aug. 28, 2014.

* cited by examiner

METHODS AND SYSTEMS FOR GSM SPECTRUM REFARMING FOR LTE SMALL CELLS

BACKGROUND

In an attempt to address a growing demand for global mobile data traffic, one proposed solution has been to deploy what is known as small cells, which involve an isolated or clustered deployment of low powered base stations in footprints of macro cellular networks such as GSM based macro cellular networks. With Long Term Evolution (LTE) becoming a key standard for high speed data services in cellular networks, deployment of LTE small cells has proven to be an efficient and inexpensive way to address the growing demand for mobile data traffic.

However, a problem with introducing LTE small cells in footprints of macro cellular networks, meaning having both the small cells and a macro cellular network use the same frequency spectrum, is a resulting interference occurring between signals transferred between user equipment (UEs) operating based on the LTE technology and those that operate based on a technology of the macro cellular networks. This interference in turn results in degraded communication between UEs of each technology.

One solution to address the problem of interference has been to deploy the two technologies in separate spectrums. However doing so requires additional dedicated spectrums for the small cells, which given the ever increasing scarcity of wireless communication resources, is not a desirable solution.

An alternative solution has been to refarm a spectrum used by a macro cellular network, in particular, spectrum in use by an older generation macro cellular network, to allow one or more small cells deployed within a coverage area of the macro cellular network to also use portions of the same spectrum for transmitting signals. In doing so, a concept of frequency partitioning has been introduced. This concept is based on the idea that as demand for older technologies such as Global System for Mobile (GSM), based on which macro base stations of cellular networks operate diminishes, more and more of GSM's spectrum may be allocated for utilization by small cells such as LTE smalls cells deployed within the coverage area of the macro cells. Frequency partitioning, also known as Static Spectrum Refarming (SSR), allows for the configuration of the LTE smalls cells to occupy a determined portion of the macro cell's spectrum and thus UEs operating based on the technology of the macro cell can avoid using frequency channels of the spectrum occupied by the LTE small cells.

However, this approach incurs inefficiencies with regard to optimal utilization of the spectrum. LTE systems are deployed in bandwidths of 1.4 MHz, 3 MHz, 5 MHz, 10 MHz, 15 MHz and 20 MHz. FIG. 1 illustrates refarming of a GSM spectrum according to a static spectrum refarming method known in the Prior Art. As shown in FIG. 1, there is a 10 MHz spectrum 101 available for use by the technology of the macro cell, i.e., GSM technology. Only 2.4 MHz of spectrum 102 is needed to satisfy the demand of GSM based UEs, owing to diminished capacity requirements. Given the limitations on bandwidths in which LTE systems can be deployed, of the 7.6 MHz of spectrum left unused, LTE system are deployed in either the 1.4 MHz, 3 MHz or 5 MHz. Deploying the LTE system in the 5 MHz spectrum results in, as can be seen from FIG. 1, 3.6 MHz of unused bandwidth 104 that is simply going to be wasted.

SUMMARY

Embodiments relate to methods and apparatuses for allocating at least one physical resource block of a first wireless access technology for utilization by a second wireless access technology, where the first wireless access technology is deployed within a coverage area of the second wireless access technology. The allocation of the at least one PRB is carried out in order to reduce or minimize the risk of negatively impacting any one of a broadcast and/or control channels of the first wireless access technology.

In one embodiment, the method includes allocating, using a network management entity, at least one of a plurality of physical resource blocks (PRBs) of a first wireless access technology for utilization by a second wireless access technology. A spectrum of the first wireless access technology is embedded within a spectrum of the second wireless access technology. The method further includes communicating, using the network management entity, a message to a controller of the first wireless access technology identifying the PRBs not allocated for utilization by the second wireless access technology.

In yet another embodiment, an apparatus for carrying out the method includes a network management entity configured to allocate at least one of a plurality of physical resource blocks (PRBs) of a first wireless access technology for utilization by a second wireless access technology. A spectrum of the first wireless access technology being embedded within a spectrum of the second wireless access technology. The apparatus is further configured to communicate a message to a controller of the first wireless access technology identifying the PRBs not allocated for utilization by the second wireless access technology.

In yet another embodiment, another method includes receiving a message identifying a plurality of physical resource blocks (PRBs) of a first wireless access technology at a controller of a second wireless access technology. The plurality of PRBs are allocated for utilization by the second wireless access technology. The method further includes determining, using the controller, a frequency channel to be used for transmitting a signal associated with the second wireless access technology such that the frequency channel corresponds to at least one of the plurality of PRBs.

In one embodiment, an apparatus for carrying out the other method includes a controller configured to receive a message identifying a plurality of physical resource blocks (PRBs) of a first wireless access technology at a controller of a second wireless access technology. The plurality of PRBs are allocated for utilization by the second wireless access technology. The controller is further configured to determine a frequency channel to be used for transmitting a signal associated with the second wireless access technology such that the determined frequency channel corresponds to at least one of the plurality of PRBs.

BRIEF DESCRIPTION OF THE DRAWINGS

Example embodiments will become more fully understood from the detailed description given herein below and the accompanying drawings, wherein like elements are represented by like reference numerals, which are given by way of illustration only and thus are not limiting of the present disclosure, and wherein.

DETAILED DESCRIPTION OF EXAMPLE EMBODIMENTS

Figure 1:
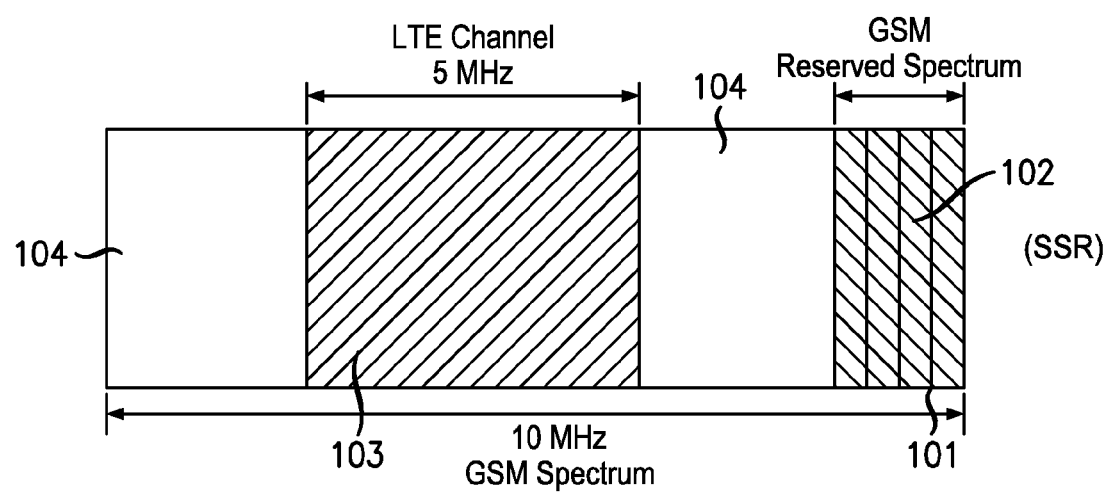
FIG. 1 illustrates refarming of a GSM spectrum according to a static spectrum refarming method known in the Prior Art.

Various embodiments of the present disclosure will now be described more fully with reference to the accompanying drawings. Like elements on the drawings are labeled by like reference numerals.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected,' or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a", "an", and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements. Such existing hardware may include one or more Central Processing Units (CPUs), digital signal processors (DSPs), application-specific-integrated-circuits, field programmable gate arrays (FPGAs), computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware, or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

Example embodiments may be utilized in conjunction with RANs such as: Universal Mobile Telecommunications System (UMTS); Global System for Mobile communications (GSM); Advance Mobile Phone Service (AMPS) system; the Narrowband AMPS system (NAMPS); the Total Access Communications System (TACS); the Personal Digital Cellular (PDC) system; the United States Digital Cellular (USDC) system; the code division multiple access (CDMA) system described in EIA/TIA IS-95; a High Rate Packet Data (HRPD) system, Worldwide Interoperability for Microwave Access (WiMAX); Ultra Mobile Broadband (UMB); and 3rd Generation Partnership Project LTE (3GPP LTE).

Devices in a wireless network may communicate using different Wireless Access Technologies (WATs). A first WAT may require a variety of frequency bands, which may or may not be broader than frequency bands used by other WATs. An example of such first WAT is LTE, which may utilize any one of 1.4 MHz, 3 MHz, 5 MHz, 10 MHz, 15 MHz and 20 MHz. Hereinafter, in the interest of brevity, the first WAT may be referred to as WAT 1, and a second WAT may be referred to as WAT 2.

Although exemplary technologies such as LTE systems and GSM systems are used throughout the disclosure to demonstrate the WAT 1 and the WAT 2, respectively, it will be appreciated that such exemplary systems are not intended to limit the scope of the disclosure to LTE and GSM systems. Methods, apparatuses and computer programs described herein with respect to the specific exemplary technology may be equally applicable to other technologies utilized by various industries in carrying out wireless communications.

In one embodiment, a network management system allocates certain physical resource blocks (PRBs) within the 10 MHZ GSM spectrum for utilization by the GSM system. Sub-carriers corresponding to the reserved PRBs are not used by the base station of the LTE system for transmission of any LTE signal. Rather, only GSM signals are transmitted on that sub-carrier from the GSM macro cell base station.

In example embodiments, the network management system allocates PRBs for the GSM macro cell such that the LTE control or signaling PRBs, also known as LTE critical PRBs, are not utilized by the GSM system or any other system but the LTE small cells. The critical PRBs may be any one of but not limited to synchronization channels, broadcast channels and channels used for transmitting control signals including but not limited to a Physical Control Format Indicator Channel (PDFICH), Physical Hybrid ARQ Indicator Channel (PHICH), a Physical Downlink Control Channel (PDCCH), a broadcast channel and a synchronization channel, Using this approach, UEs operating based on the LTE technology are not impacted by signal transmissions by the GSM system. When the network management system determines that the demand for resources in the GSM system is low or when the UE receiving GSM signals is located within a coverage area of the LTE system when the demand for resources in the GSM system is high, GSM signals are transmitted only over sub-carriers corresponding to the PRBs allocated for utilization by the GSM macro cell.

When a UE operating based on the GSM system is located not within the coverage of LTE small cells but rather close to or in the vicinity of the LTE small cells (also referred to as guard region as will be explained with respect to FIG. 6 below), and the demand for resources in the GSM system is high, the transmission power of the LTE small cell may be set so as to avoid excessive interference to UEs of the GSM system located in the vicinity of the LTE small cell. Also, in this scenario, the GSM macro cell may schedule signals for transmission to GSM UEs on sub-carriers corresponding to PRBs allocated for utilization by the LTE small cells. That is GSM signals will be transmitted over frequency channels corresponding to the critical PRBs of the LTE small cell. The transmit power of the LTE base station is configured such that the Signal to Interference plus Noise Ratio (SINR) degradation of those GSM UEs located at a border of the guard region be less than 1 dB.

When a UE of the GSM system is neither within the coverage area of a LTE small cell nor in the vicinity of the coverage area of the LTE small cell, the controller of the GSM base station schedules signals of the GSM system over the entire frequency spectrum of the GSM system, i.e., over the entire exemplary 10 MHz spectrum, discussed with respect to FIG. 1.

Figure 2:
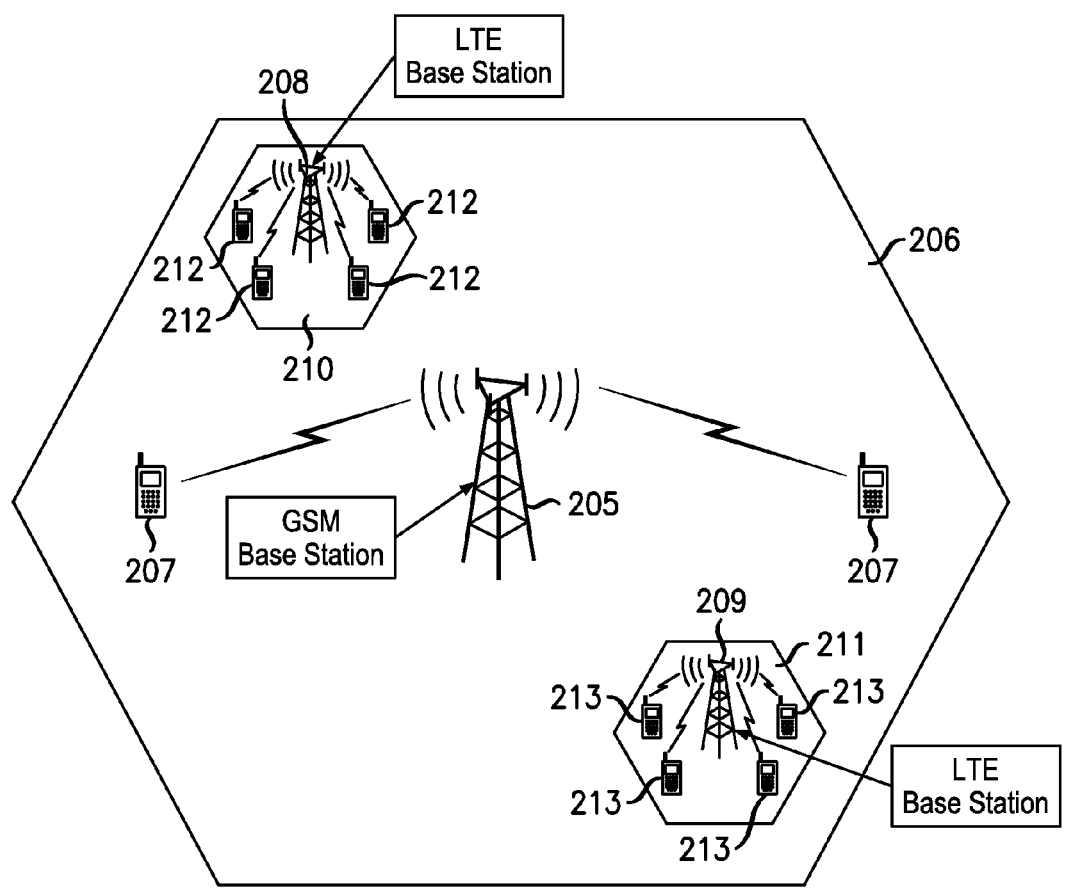
FIG. 2 illustrates a system setup, according to an example embodiment.

FIG. 2 illustrates a system setup, according to an example embodiment.

Referring to FIG. 2, the macro cell 205 has a coverage area 206. UEs 207 within the coverage area 206 operate based on the technology of the macro cell 205. As previously indicated, a non-limiting and exemplary technology on which the macro cell is based is the GSM technology. Within the coverage area 206, there may be one or more small cells (e.g., femto cells, pico cells, etc.) deployed such as small cells 208 and 209. Small cells 208 and 209 may be based on the same technology, an exemplary and non-limiting example of which may be the LTE technology, or may each operate based on different technologies. Small cells 208 and 209 have coverage areas 210 and 211 respectively. UEs 212 and UEs 213 operate based on the underlying technology of their respective base stations 208 and 209, i.e., LTE technology.

The base station 205 serves a geographical region, which may be larger than a geographical area served by any one of the base stations 208 or 209. It should be understood that, while FIG. 2 depicts only two small cell base stations 208 and 209, there may be additional, adjacent base stations located within the geographical coverage area 206 of the macro cell 205.

It should be understood that at any point in time there may be no UEs 207, 212 or 213 served by any of the base stations 205, 208 and 209. The UEs may be any electronic device capable of incorporating a Subscriber Identity Module (SIM) operating based on the technology of the base station with which they communicate. Exemplary UEs may include but are not limited to a GSM enabled cellular device, an LTE enabled cellular device, a dual GSM/LTE enabled cellular device, etc. These devices may include a phone, a laptop, a tablet, etc.

Figure 3:
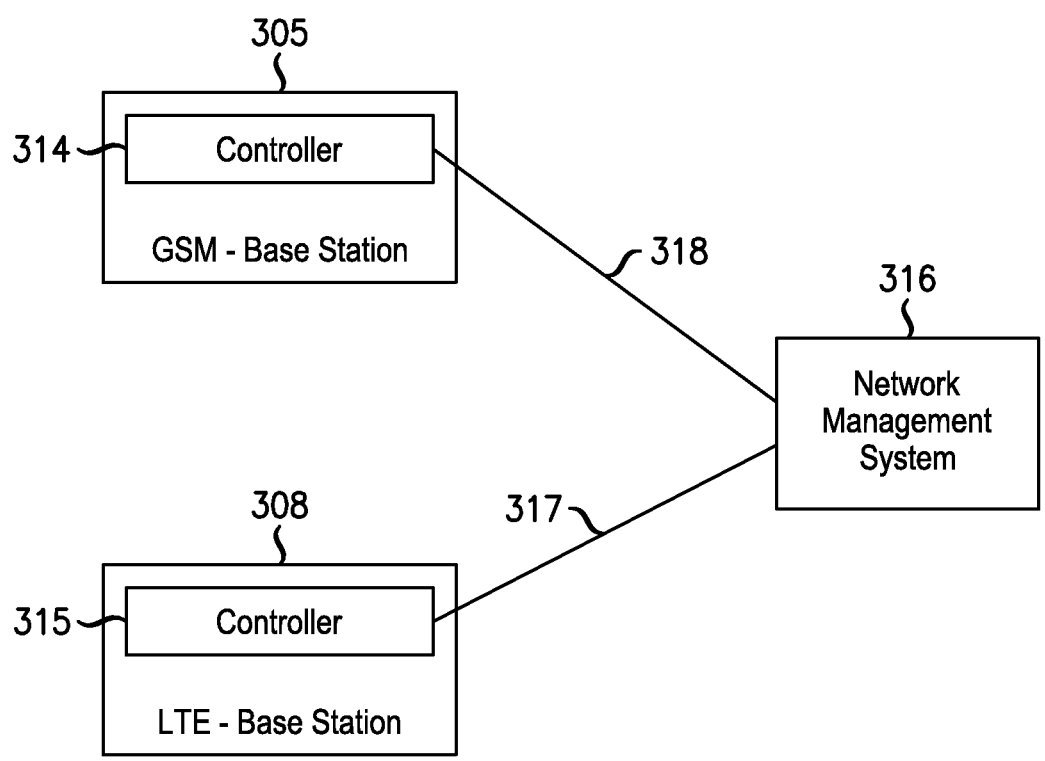
FIG. 3 illustrates a communication established between controllers of a GSM macro cell, any one of a plurality of LTE small cells and a network management system, according to an example embodiment.

FIG. 3 illustrates a communication established between controllers of a GSM macro cell, any one of a plurality of LTE small cells and a network management system, according to an example embodiment. It should be understood that the base stations 305 and 308 may include other components not illustrated in FIG. 2. In an example embodiment, the base station 305 is a GSM base station incorporating a Base Station Controller (BSC) 314 used for scheduling signals to be transmitted to GSM enabled UEs located within a coverage area of the base station 305. Base station 308 is an LTE enhanced NodeB (eNodeB). The LTE eNodeB incorporates an LTE controller 315. Base Stations 305 and 308 may further include a modem (not shown) for establishing communication to or from the network management system.

The network management system 316 is in charge of allocating PRBs of the LTE small cells for utilization by either the LTE small cell or the GSM macro cell. Network management system 316 may be a separate entity such as currently existing network operators or may be programmed into controller 315 of the LTE technology. In a case in which the network management entity is embedded within the controller 315, the BSC 314 and controller 315 may communicate directly. Network management system is in communication with BSC 314 and controller 315 relaying to both BSC 314 and controller 315, a plurality of messages containing information on PRBs allocated for utilization by the respective controller of each base station 305 and 308, the critical PRBs, and/or information on guard region created around each LTE small cell. The communication links 317 and 318 between the network management entity 316, BSC 314 and controller 315, may be wireless or wired.

Figure 4A:
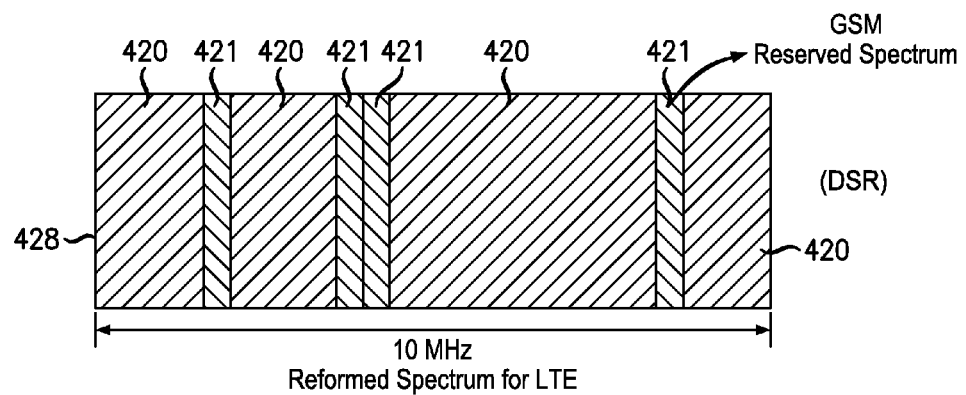
FIGS. 4A-B illustrate refarming of a GSM spectrum based on a dynamic spectrum refarming method, according to some example embodiments.
Figure 4B:
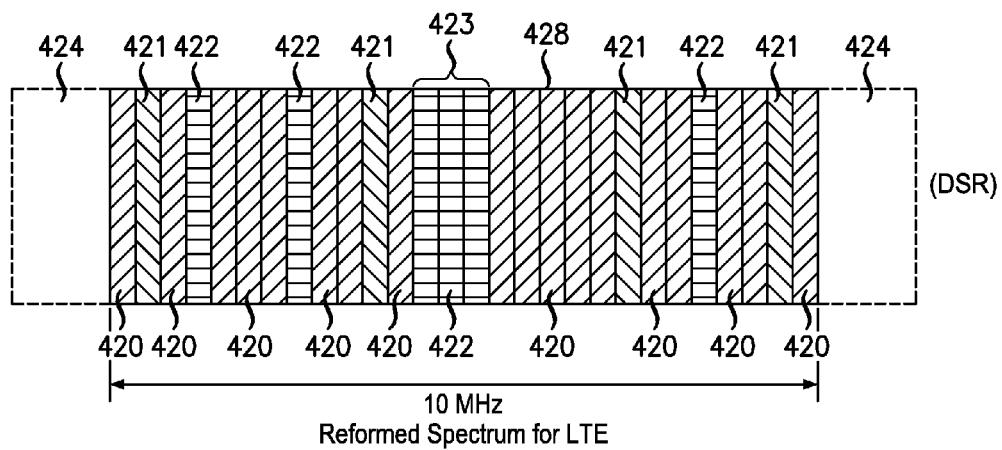

FIGS. 4A-B illustrate refarming of a GSM spectrum based on dynamic spectrum refarming, according to some example embodiments.

With reference to FIG. 4A, a network management system refarms an entire spectrum 428 used by the GSM technology so that PRBs can be allocated for utilization by the LTE small cell anywhere over the entire spectrum 428. However, certain PRBs 421 within the refarmed spectrum of the GSM system are allocated so that no LTE signal is scheduled for transmission over the allocated PRBs. Only signals of the GSM system are transmitted over frequency channels corresponding to the allocated PRBs 421. Signals of the LTE system are scheduled over any of the refarmed PRBs 420. This allocation enables avoiding interference between GSM and LTE signals transmitted by their respective base stations whenever a GSM UE is located within a coverage area of one or more LTE small cells deployed within a coverage area of the GSM macro cell, as described above with reference to FIG. 1.

FIG. 4B illustrates dynamic refarming of the GSM spectrum in another exemplary embodiment. According to the exemplary embodiment of FIG. 4B, certain PRBs of the refarmed spectrum 428 are reserved for synchronization and signal controlling within the LTE technology. These certain PRBs are referred to the critical PRBs 422, described above, which are for a proper transmission of data and control information between the a LTE small cell base stations such as any of the base stations 208 and 209 of FIG. 1 and LTE enabled UEs in communication with each LTE small cell base station.

As indicated above, examples of critical PRBs 422 may include but are not limited to a Physical Control Format Indicator Channel (PCFICH), a Physical Hybrid ARQ Indicator Channel (PHICH), a Physical Downlink Control Channel (PDCCH), a broadcast channel and a synchronization channel. The PCFICH may be used to inform UEs of a particular format of a signal being received. The PHICH may be used to transmit hybrid ARQ signals indicating whether a transport block has been correctly received. The PDCCH channel may be used to carry mainly scheduling information including but not limited to downlink resource scheduling, uplink power control instructions, uplink resource grant, indication for paging or system information. The exemplary critical PRBs described herein are for downlink communication. The critical PRBs are similarly used for the uplink communication as well.

While the ideal objective in determining PRBs to be allocated for use by the GSM system would include avoiding every critical PRB of the LTE system, such objective cannot be fully realized in practice because locations of some of the critical PRBs are not fixed and/or may occupy all the available PRBs of an LTE frequency channel. Therefore, some of the critical PRBs may be suppressed (punctured) and scheduled as allocated PRBs for the GSM macro cell. Therefore, the number of critical PRBs suppressed at the expense of allocated PRBs for the GSM macro cell may be reduced or minimized.

Certain critical PRBs can be avoided and thus not suppressed at the expense of allocating PRBs for the GSM macro cell. Taking the example of refarming the GSM 10 MHz spectrum with a 10 MHz LTE channel, LTE broadcast and synchronization channels, which are two types of critical PRBs 422, discussed above, are located within a central 1.08 MHz 423 of the refarmed 10 MHz channel 420. Therefore, it may be possible to avoid suppressing the synchronization and broadcast channels by avoiding any PRB within the central 1.08 MHz 423 of the 10 MHz, to be allocated for utilization by the GSM macro cell.

Furthermore, PCFICH, may occupy several, i.e. 4, predetermined positions of 75 KHz within the refarmed LTE 10 MHz channel. Allocation of the PCFICH channels may be avoided by not using certain 75 kHz chunks of the frequency spectrum. Because the PCFICH occurs at fixed positions, the network management system may avoid affecting these channels by avoiding allocating PRBs in these chunks of the frequency spectrum.

The controller of an LTE small cell base station may determine these fixed positions of PCFICH channels based on periodically-transmitted reference signals. Reference signals, as known in the art, are periodically transmitted signals used for calculating channel impulse response. The controller of the LTE small cell base station may calculate the next 75 kHz chunk, based on its transmissions of reference signals. The controller of the LTE small cell base station may transmit the calculated locations of the PCFICH channels to the network management system.

However, positions of PCFICH and PHICH are not fixed and hence changes with cell identification (ID) of each LTE base stations such that PCFICH and PHICH may spread and eventually occupy every PRB of the 10 MHz LTE channel, as the number of LTE base stations is increased. Therefore, if cell IDs of every LTE base station is used in determining the PRBs to be allocated for the GSM macro cell, allocation of PRBs for the GSM macro cell would not be possible without negatively effecting the PCFICH and PHICH and as a consequence the data and/or power transmission of the LTE system.

Therefore, using a subset of all possible cell IDs, allows the network management system to use known positions of PCFICH and PHICH and thus avoid allocating PRBs corresponding to PCFICH and PHICH for utilization by the GSM macro cell.

PDCCH on the other hand, is known to occupy every PRB in an LTE channel and thus is vulnerable to being suppressed by the network management system during PRB allocation for the GSM macro cell. However, because LTE multiplexes and interleaves several PDCCHs within one LTE channel, the impact of suppressing by the network management system is reduced as PDCCHs tolerate a certain level of error. Furthermore, LTE technology allows an LTE system to aggregate elements of control channels thus transforming PDCCHs into being more robust against errors and thus reduces a number of PDCCHs that can be simultaneously used Aggregation of elements further provides a compensation for an error rate that may result from suppressing PDCCHs.

Having described the concepts of refarming of spectrums and limitations that are considered in refarming a GSM spectrum with an LTE channel, we now turn to describing the process for performing such refarming.

Figure 5:
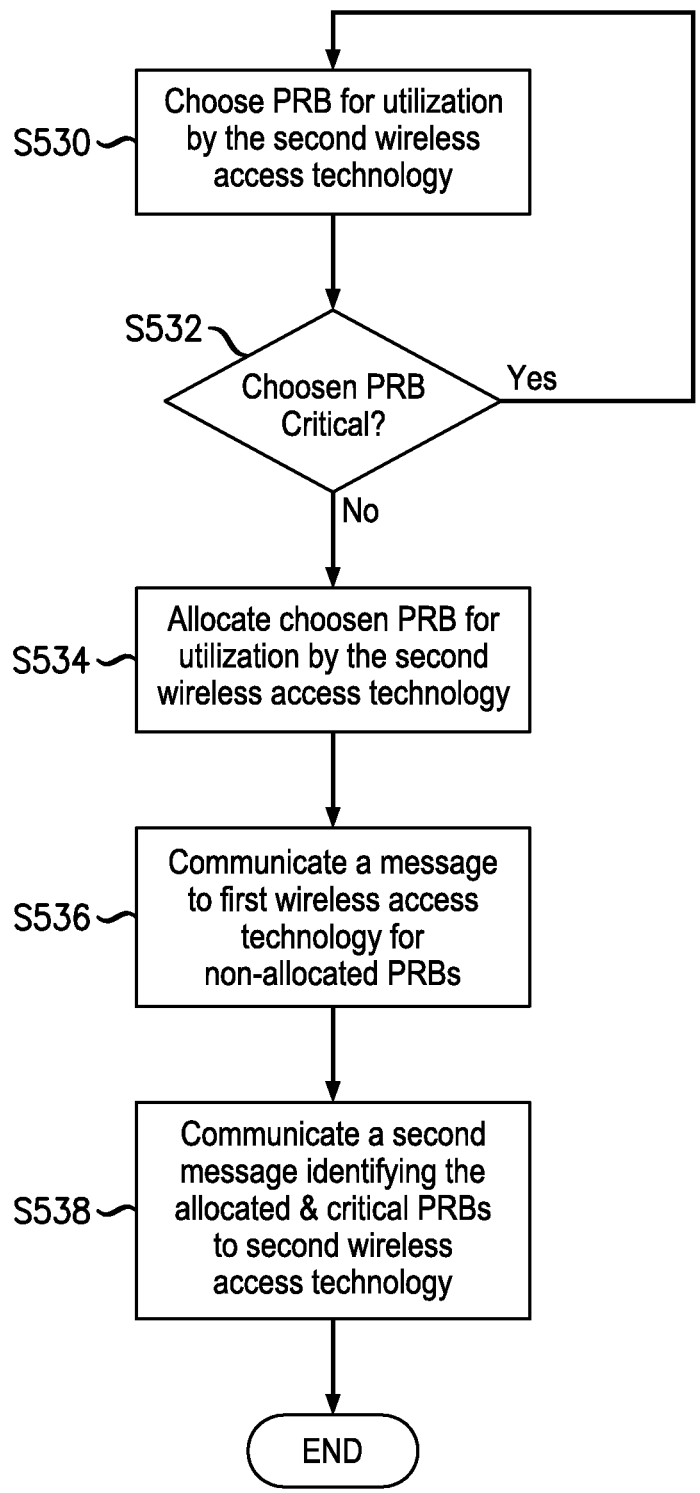
FIG. 5 describes a process of allocation of PRBs, according to an example embodiment.

FIG. 5 describes a process of allocation of PRBs, according to an example embodiment.

At S530, the network management system 316, which may have been incorporated into a controller of WAT 1, i.e. an LTE small cell base station, or may be a separate entity already existing within the communication structure of the LTE network, chooses one of the PRBs of the LTE frequency channel to be allocated for utilization by the WAT 2, i.e., GSM macro cell base station. The choosing of one of the PRBs may be carried out randomly or in a predetermined sequential order of available PRBs. At S532, the network management system may examine each candidate PRB to determine whether or not the candidate PRB constitutes a critical PRB, such as any one of, but not limited to, a PCFICH, a PHICH, a PDCCH, a broadcast channel, and/or a synchronization channel. If the network management system determines that the chosen PRB is a critical PRB, then the process reverts back S530, so that the network management system may select another candidate PRB.

If, however, the network management system determines that the candidate PRB is a non-critical PRB, the candidate PRB is then allocated by the network management system, at S534, for utilization by the base station of the GSM system. At S536, the network management system communicates a message to an LTE small cell base station, informing the controller of the LTE small cell base station of the PRBs not allocated for utilization by the GSM macro cell, so that signals between the LTE small cell base station and LTE enabled UEs of the LTE system, may be scheduled on the non-allocated PRBs.

At S538, the network management system may communicate a second message to the controller of the GSM macro cell base station. The second message identifies for the GSM controller, PRBs that were allocated for utilization by the second wireless access technology at S534, and the critical PRBs of the LTE small cell. The second message enables the GSM macro cell controller to determine, which frequency channels to use for communicating with GSM enabled UEs of the GSM system. The process may end thereafter.

Figure 6:
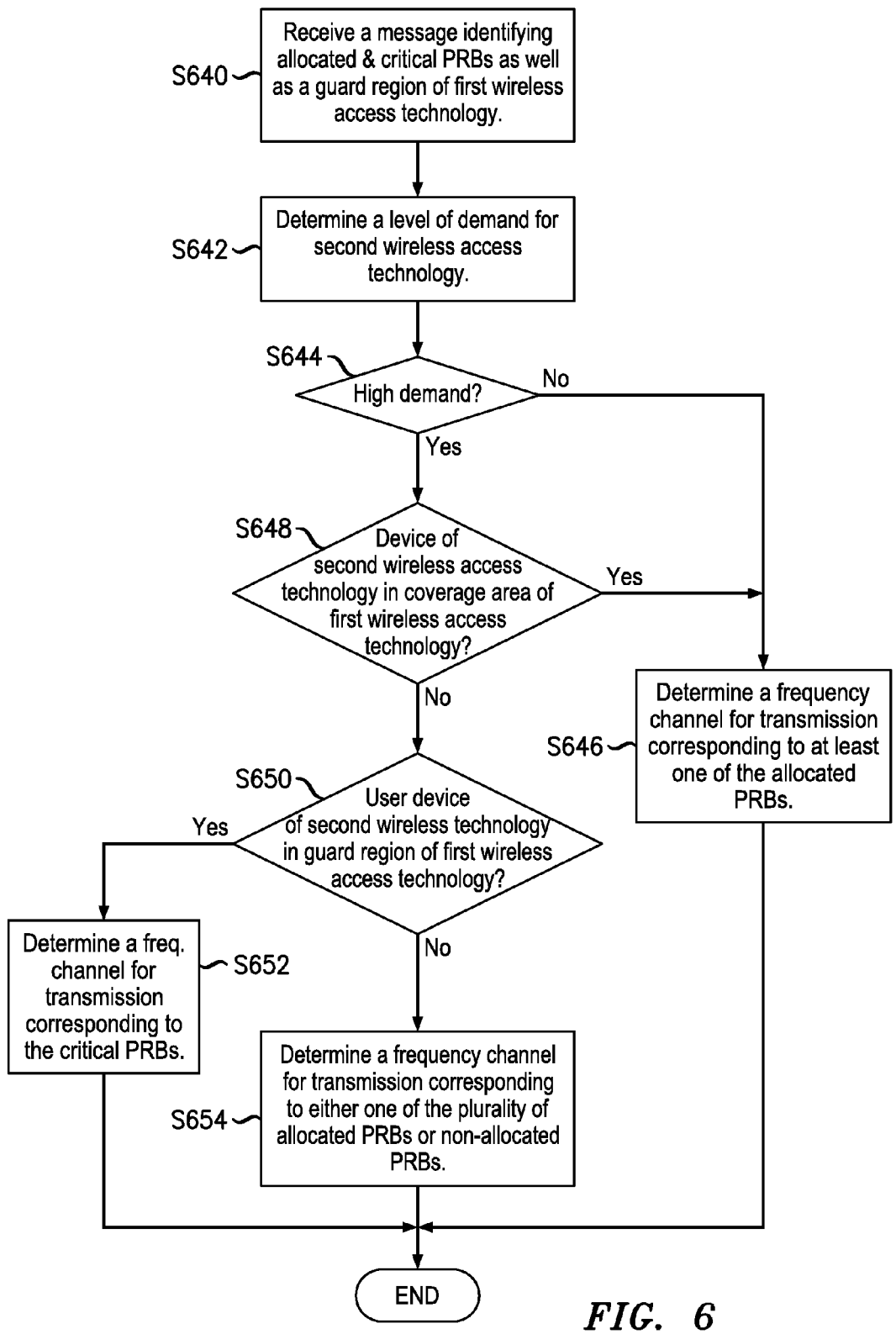
FIG. 6 describes a process carried out by a second wireless access technology for scheduling signals over appropriate frequency channels, according to an example embodiment.

FIG. 6 describes a process carried out by a second wireless access technology for scheduling signals over appropriate frequency channels, according to an example embodiment.

At 640, the controller of the GSM macro cell base station, such as controller 314 of FIG. 3, receives a message from the network management system. The message identifies for the GSM controller the allocated and critical PRBs of the first wireless access technology as well as a guard region of the LTE small cell. Information corresponding to each of the allocated PRBs, the critical PRBs and the guard region may be communicated in one message or alternatively may be communicated in separate messages.

Referring back to FIG. 4B, a guard region 424 may be defined around each LTE small cell. The guard region may be larger than a coverage area of each LTE small cell around which the guard region is created (FIG. 4B not drawn to scale). When UEs of the GSM system, are located within the coverage area of the LTE small cell, an LTE interference may be avoided by scheduling the GSM signals over frequency channels corresponding to PRBs allocated, by the network management system, for utilization by the GSM macro cell. However, when UEs of the GSM technology are not located within the coverage area of the LTE small cell but close to the coverage area of the LTE small cell, the UEs of the GSM technology may experience significant interference from the LTE communication signals. A guard region allows for signals destined for UEs of the GSM technology located within the guard region, to be scheduled over frequency channels corresponding to the critical PRBs reserved for utilization by the LTE small cell around which the guard region 424 is created. Furthermore, the transmit power of the LTE small cell is configured such that the Signal to Interference plus Noise Ratio (SINR) degradation of those GSM UEs located at a border of the guard region should be less than 1 dB.

At S642, the controller of the GSM macro cell base station determines a level of demand for frequency channel usage within the frequency spectrum used by the GSM technology. In doing so the GSM controller determines that the frequency channels of the GSM system are under-utilized and thus a smaller number of frequency channels are sufficient for GSM transmissions. The GSM controller may make this determination by using any one of or a combination of factors such as a number of GSM enabled UEs present in the coverage area of the GSM macro cell, usage trend associated with each GSM enabled UE present in the GSM macro cell coverage area, and/or traffic conditions in the coverage area of the GSM macro cell during any particular time of the day, etc. For example, demand for GSM frequency channels may be higher during the day, in which UEs demand greater bandwidth for their operations and less bandwidth during the evening hours when users may perform more web-browsing and video watching via various small cells located within residential buildings, and thus demand for GSM frequency channels may not be as high.

At S644, if the GSM controller determines that the level of demand is low, then at S646, the GSM controller determines at least one frequency channel for transmitting signals between the GSM base station and UEs of the GSM technology such that the determined over frequency channel(s) corresponds to the allocated PRBs of the LTE small cell S646. Thereafter, the process may end.

If, however, the GSM controller determines, at S644, that the level of demand is high, then the GSM controller determines at least one frequency channel for transmitting the signals for communication between the base station and a target UE of the GSM technology, based on a location of each target UE of the GSM technology.

At S648, the GSM controller determines whether the target UE is located within the coverage area of the LTE small cell. If the controller determines that the target UE is located within the coverage area of the LTE small cell, the process reverts back to S646, and the controller of the GSM macro cell determines at least one frequency channel for transmitting signals between the GSM base station and the target UE of the GSM system such that the determined frequency channel(s) corresponds to the allocated PRBs.

If, however, the GSM controller determines that the target UE is not located within the coverage area of the LTE small cell, the GSM controller makes a determination at S650 as to whether the target UE is located within a guard region corresponding to the LTE small cell. If the target UE is located within the guard region, the controller of the GSM macro cell determines, at S652, at least one frequency channel for transmitting signals between the GSM base station and the target UE of the GSM system such that the determined frequency channel(s) corresponds to the critical PRBs of the LTE small cell.

If, the GSM controller determines, at S650, that the target UE is not located within the guard region, then, at S654, the GSM determines any frequency channel from among the frequency channels of the entire frequency spectrum of the GSM system to be used for transmitting signals between the GSM base station and target UE of the GSM system, irrespective of whether the frequency channels correspond to any allocated PRBs or non-allocated PRBs of the LTE small cell, which may include the critical PRBs of the LTE small cell. This is because if the target UE is not within and/or close to the coverage area of the LTE small cell, there can be no interference between the signals of the LTE system and those of the GSM system. The process may end thereafter.

While example embodiments have been described with reference to GSM and LTE as the first or second WAT, it should be understood that other example embodiments may utilize other WATs as the first or second WAT.

Variations of the example embodiments are not to be regarded as a departure from the spirit and scope of the example embodiments, and all such variations as would be apparent to one skilled in the art are intended to be included within the scope of this disclosure.

What is claimed:

1. A method, comprising:
receiving a message identifying a plurality of available physical resource blocks (PRBs) of a first wireless access technology as well as critical PRBs of the first wireless access technology at a controller of a second wireless access technology, the plurality of PRBs being allocated for utilization when establishing communication based on the second wireless access technology and the critical PRBs being critical to operation according to the first wireless access technology;
determining, using the controller, at least one of the available PRBs and the critical PRBs for utilization when establishing the communication based on the second wireless access technology, based on
a level of demand for utilization of the second wireless access technology,
an overlap in a coverage area of the first wireless access technology and the second wireless access technology, and
whether devices that communicate with the controller based on the second wireless access technology, operate in at least one guard region of the first wireless access technology; and
transmitting, using the controller, a signal associated with the second wireless access technology over at least one frequency channel corresponding to the at least one determined PRB, the transmitting transmits the signal over at least one of the critical PRBs when communicating with a given one of the devices and the given one of devices is located in the at least one guard region of the first wireless access technology.

2. The method of claim 1, wherein the message further identifies the at least one guard region associated with the first wireless access technology, the at least one guard region being a region around at least one cell of the first wireless access technology.

3. The method of claim 2, wherein the at least one guard region is larger than the coverage area of the first wireless access technology.

4. The method of claim 1, wherein
the level of demand for utilization of the second wireless access technology is a level of demand for utilization of frequency channels of the second wireless access technology, and
upon determining that the level of demand is high and a user equipment operating based on the second wireless access technology is located outside of the coverage area of the first wireless access technology, the transmitting transmits the signal over the at least one frequency channel or at least one additional frequency channel corresponding to PRBs not allocated for utilization by the second wireless access technology.

5. The method of claim 4, wherein the first wireless access technology is a Long Term Evolution (LTE) technology and the second wireless access technology is a Global System for Mobile (GSM) technology, and
the plurality of critical PRBs include a physical control format indicator channel (PCFICH), a physical hybrid ARQ indicator channel (PHICH), a physical downlink control channel (PDCCH), a broadcast channel and a synchronization channel.

6. An apparatus, comprising:
a controller configured to,
receive a message identifying a plurality of available physical resource blocks (PRBs) of a first wireless access technology as well as critical PRBs of the first wireless access technology, the controller being a controller of a second wireless access technology, the plurality of PRBs being allocated for utilization when establishing communication based on the second wireless access technology and the critical PRBs being critical to operation according to the first wireless access technology;
determine at least one of the available PRBs and the critical PRBs for utilization when establishing the communication based on the second wireless access technology, based on
at least a level of demand for utilization of the second wireless access technology,
an overlap in a coverage area of the first wireless access technology and the second wireless access technology, and
whether devices that communicate with the controller based on the second wireless access technology, operate in at least one guard region of the first wireless access technology; and
transmit a signal associated with the second wireless access technology over at least one frequency channel corresponding to the at least one determined PRB, the controller being configured to transmit the signal over at least one of the critical PRBs when communicating with a given one of the devices and the given one of devices is located in the at least one guard region of the first wireless access technology.

7. The apparatus of claim 6, wherein
the level of demand for utilization of the second wireless access technology is a level of demand for utilization of frequency channels of the second wireless access technology, and
upon the controller determining that the level of demand is high and a user equipment operating based on the second wireless access technology is located outside of the coverage area of the first wireless access technology, the controller transmits the signal over the at least one frequency channel or at least one additional frequency channel corresponding to PRBs not allocated for utilization by the second wireless access technology.

8. The apparatus of claim 6, wherein the message further identifies the at least one guard region associated with the first wireless access technology, the at least one guard region being created around at least one cell of the first wireless access technology.

* * * * *